United States Patent
Yamaji et al.

(10) Patent No.: US 8,300,064 B2
(45) Date of Patent: Oct. 30, 2012

(54) APPARATUS AND METHOD FOR FORMING A COMBINED IMAGE BY COMBINING IMAGES IN A TEMPLATE

(75) Inventors: Kei Yamaji, Kanagawa (JP); Yuko Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 666 days.

(21) Appl. No.: 12/411,112

(22) Filed: Mar. 25, 2009

(65) Prior Publication Data

US 2009/0244096 A1    Oct. 1, 2009

(30) Foreign Application Priority Data

Mar. 26, 2008    (JP) ................................. 2008-080446

(51) Int. Cl.
*G09G 5/00* (2006.01)

(52) U.S. Cl. ........ 345/629; 345/619; 345/626; 715/204; 715/243

(58) Field of Classification Search .................. 345/626, 345/629, 619; 715/204, 243
See application file for complete search history.

(56) References Cited

U.S. PATENT DOCUMENTS

| | | | |
|---|---|---|---|
| 6,285,468 B1* | 9/2001 | Cok et al. ...................... | 358/450 |
| 7,773,782 B2 | 8/2010 | Funakura | |
| 8,040,551 B2 | 10/2011 | Ono et al. | |
| 2005/0044485 A1* | 2/2005 | Mondry et al. ............... | 715/502 |
| 2005/0105806 A1 | 5/2005 | Nagaoka et al. | |
| 2005/0212817 A1* | 9/2005 | Cannon et al. ................ | 345/619 |
| 2006/0213386 A1 | 9/2006 | Funakura | |
| 2007/0058884 A1* | 3/2007 | Rother et al. ................. | 382/284 |
| 2007/0146833 A1 | 6/2007 | Satomi et al. | |
| 2007/0165968 A1 | 7/2007 | Terayoko | |
| 2007/0195995 A1 | 8/2007 | Matsumoto et al. | |
| 2007/0201765 A1* | 8/2007 | DuBois ......................... | 382/293 |

FOREIGN PATENT DOCUMENTS

| | | |
|---|---|---|
| JP | 10-124655 A | 5/1998 |
| JP | 2004-072145 A | 3/2004 |
| JP | 2004-289706 A | 10/2004 |
| JP | 2005-174308 A | 6/2005 |
| JP | 2006-146591 A | 6/2006 |
| JP | 2006-287917 A | 10/2006 |
| JP | 2006-304265 A | 11/2006 |

(Continued)

OTHER PUBLICATIONS

Notification of Reasons for Refusal, dated Jul. 10, 2012, issued in corresponding JP Application No. 2009-076355, 7 pages in English and Japanese.

*Primary Examiner* — Michelle L Sams
(74) *Attorney, Agent, or Firm* — Sughrue Mion, PLLC

(57) ABSTRACT

The image forming apparatus and method combine images to form one combined image by using an image formed by clipping, from images including the same person, parts of a face and a body of the person and combining the parts. The apparatus and method select, from images stored in advance, images to be combined in image combination frames of a template for the combined image, the template being stored in advance and including the image combination frames for which image editing conditions are defined, edit the selected images according to each of the image editing conditions for each of the image combination frames of the template and arrange the edited images in the image combination frames of the template and combining the arranged images.

14 Claims, 9 Drawing Sheets

FOREIGN PATENT DOCUMENTS

| | | |
|---|---|---|
| JP | 2007-116658 A | 5/2007 |
| JP | 2007-172344 A | 7/2007 |
| JP | 2007-194948 A | 8/2007 |
| JP | 2007-226312 A | 9/2007 |
| JP | 2007-249434 A | 9/2007 |
| JP | 2007-312058 A | 11/2007 |

* cited by examiner

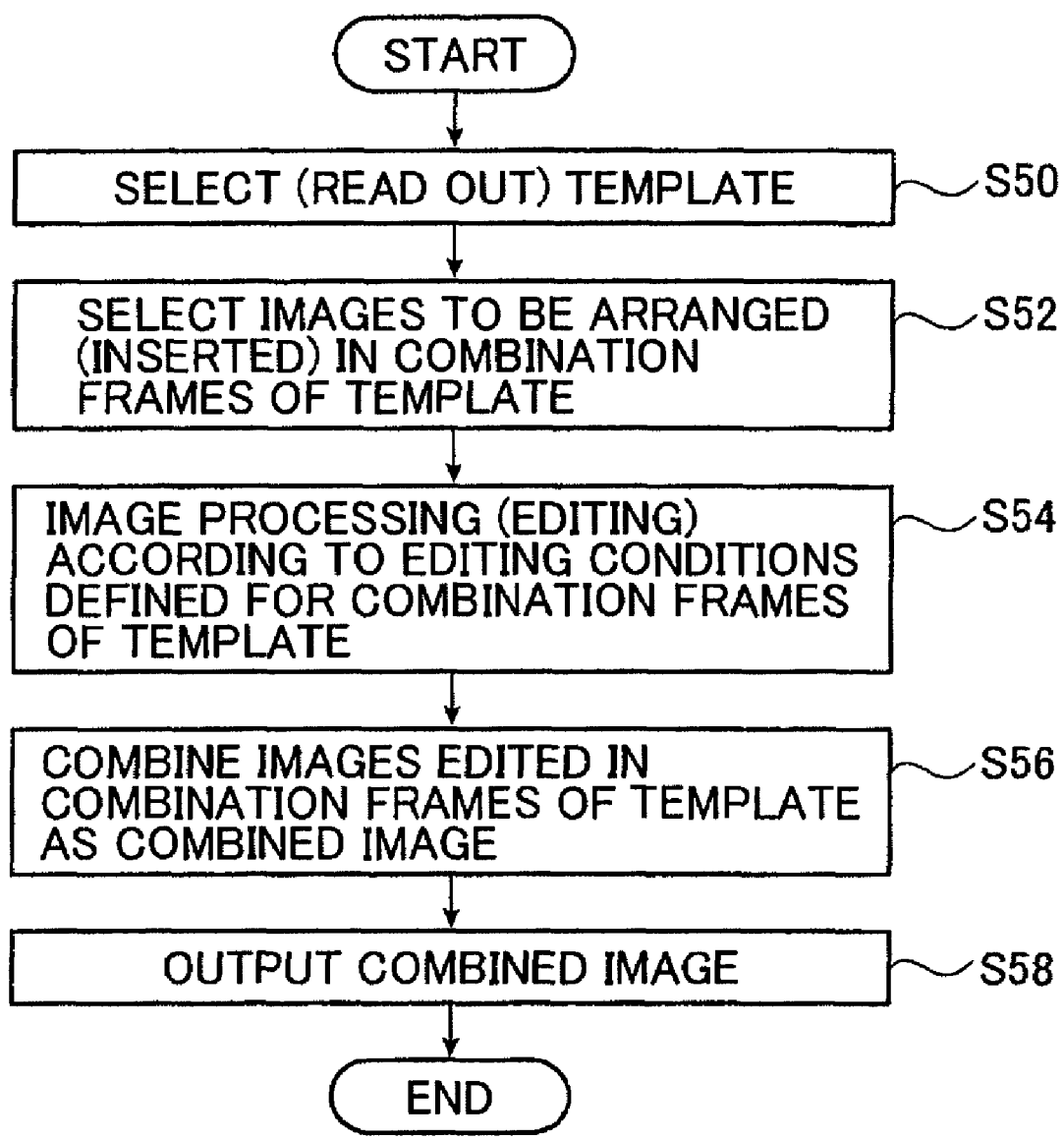

| FILE NAME | FEATURE |
|---|---|
| xxx.jpg | WHOLE BODY PHOTOGRAPHED |
| xxx.jpg | WHOLE BODY PHOTOGRAPHED |
| xxx.jpg | ONLY UPPER BODY PHOTOGRAPHED |
| xxx.jpg | CLOSEUP OF FACE |
| xxx.jpg | IMAGE FACING TO RIGHT (ONLY LEFT HALF OF FACE PHOTOGRAPHED) |

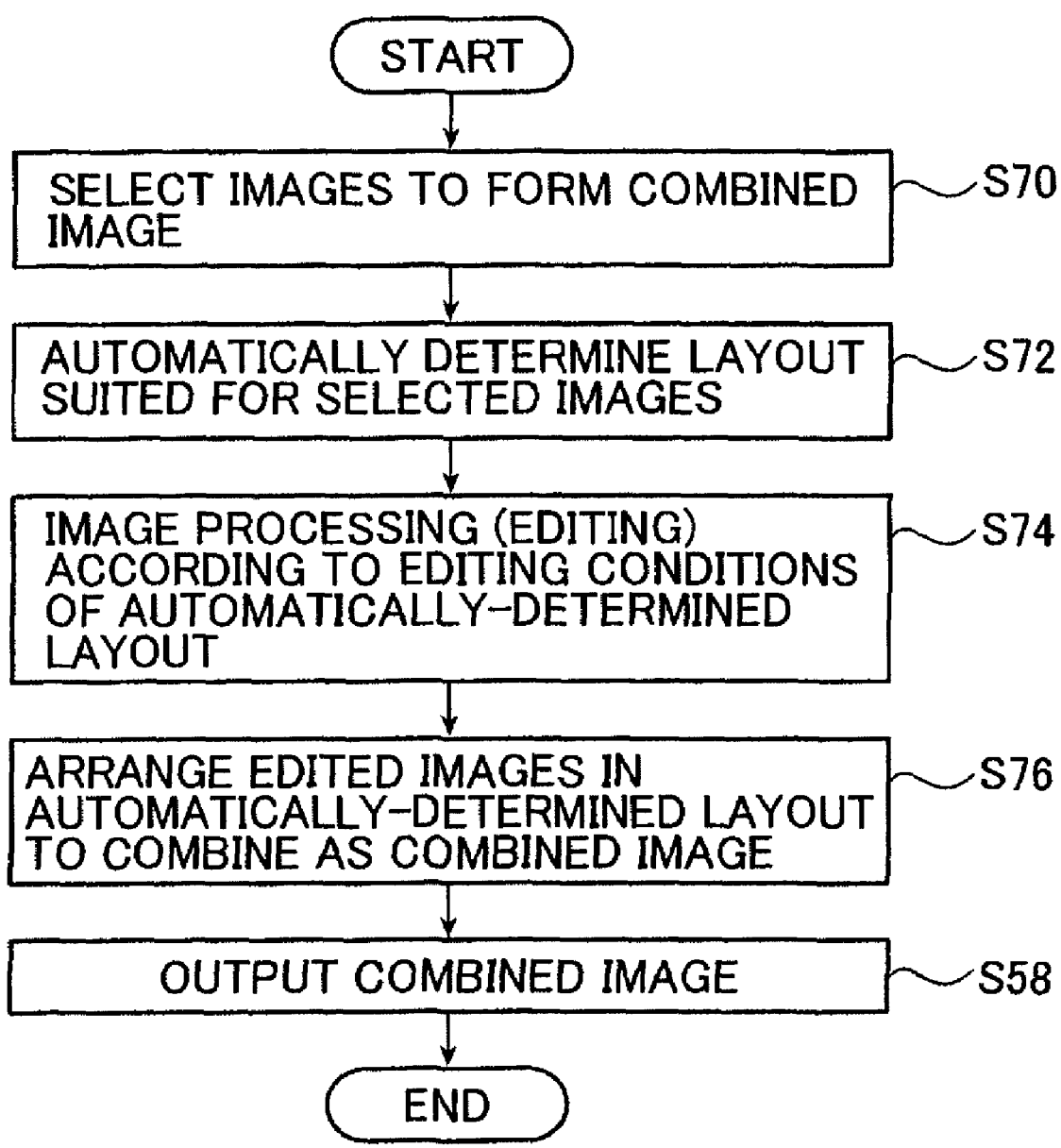

APPARATUS AND METHOD FOR FORMING A COMBINED IMAGE BY COMBINING IMAGES IN A TEMPLATE

The entire contents of documents cited in this specification are incorporated herein by reference.

BACKGROUND OF THE INVENTION

The present invention relates to an image forming apparatus and an image forming method for combining a plurality of images to form one combined image, and more particularly, to an image forming apparatus and an image forming method for forming a combined image by using an image formed by clipping, from a plurality of images including the same person, parts of a face and a body of the person and combining the parts.

In recent years, there have been devised various methods and systems for extracting, using image analyzing methods such as face extraction and calculation of image feature amounts, images required by a user out of an image group including images and the like photographed by the user, to thereby arrange and edit the images using the extracted images.

For example, JP 2005-174308 A discloses a digital media arranging method and a digital media arranging apparatus for arranging a plurality of digital images by grouping the digital images for each of subjects. JP 2005-174308 A describes that it is possible to arrange a large number of photographs in a short period of time on the basis of persons in the photographs by applying face recognition processing to the digital images, determining similarity of faces in the digital images, and classifying, on the basis of a result of the determination, the digital images in folders created for each of the persons.

JP 10-124655 A discloses a digital album creating apparatus for retrieving images by using characteristics of subjects as an index. JP 10-124655 A describes that characteristics of persons as subjects such as colors of faces of the persons, presence or absence of makeup, colors of clothes, and presence or absence of glasses are extracted from images, those kinds of information are set as indexes, and images are retrieved on the basis of the indexes.

JP 2004-289706 A discloses an image processing method and an image processing apparatus for automatically forming images processed to be specialized for specific subjects in images. JP 2004-289706 A describes that a face of a specific subject person designated by a user is set as a key subject, face distinction is applied to images, and, if there is present a face matching the key subject, editing such as trimming and expansion and reduction processing is performed so as to arrange the subject in centers of the images.

As described above, with the methods disclosed in JP 2005-174308 A and JP 10-124655 A, it is possible to classify a large number of images and retrieves images on the basis of results of the face recognition and the other image analyzing methods. Further, as described in JP 2004-289706 A, it is also possible to set a specific subject and edit images according to the subject.

Such a conventional image editing method for performing layout of images using face extraction, as disclosed in JP 2004-289706 A, is, in general, a method for the purpose of performing editing such as trimming and arrangement of images to prevent faces, bodies and the like of subjects from being cut and to arrange a main subject (person) in the centers of images.

However, in such a case as described above, an image with poor composition, an image not including parts of a face and a body, and the like cannot be effectively used. Accordingly, an image having monotonous feeling as a whole is obtained.

SUMMARY OF THE INVENTION

It is an object of the present invention to solve the above-mentioned problems of the related arts and to provide an image forming method capable of easily and simply forming an attractive combined image that effectively uses an image with poor composition and an image not including parts of a face and a body and that is different from an image in which an entire subject is merely arranged to fit in the image, and an image forming apparatus for realizing the image forming method.

In order to solve the above-described problems, the image forming apparatus of the present invention is an image forming apparatus for forming a combined image by combining a predetermined number of images, and comprises an image storing unit that stores a plurality of images; a template storing unit that stores a template for the combined image, the template including a predetermined number of image combination frames for which image editing conditions are defined; an image selecting unit that selects the predetermined number of images to be combined in the predetermined number of image combination frames of the template out of the plurality of images; an image editing unit that edits each of the selected images according to each of the image editing conditions for each of the predetermined number of image combination frames of the template; and an image combining unit that arranges each of the edited images in each of the predetermined number of image combination frames of the template and combines the arranged images to form the combined image.

In the present invention, it is preferable that the image editing conditions for the predetermined number of image combination frames include designation of a trimming part of a subject in the plurality of images, and that the editing performed by the image editing unit include expansion and reduction and trimming of the plurality of images corresponding to sizes of the predetermined number of image combination frames of the template.

It is also preferable that the image forming apparatus further comprise an image evaluating unit that evaluates the plurality of images stored in the image storing unit, and that the image selecting unit determines, based on a result of the evaluation by the image evaluating unit, images to be arranged in the predetermined number of image combination frames of the template.

It is further preferable that the image evaluating unit evaluate whether or not a plurality of different parts can be clipped in the same image.

Furthermore, it is preferable that the image selecting unit select only images including a specific person.

It is further preferable that the image selecting unit display, according to each of the image editing conditions for each of the predetermined number of image combination frames of the template, only images which are candidates to be combined, to enable the selection.

It is still further preferable that the image editing conditions for the predetermined number of image combination frames include an image editing condition for trimming a part of a face of a subject, and moreover, it is preferable that the image editing conditions for the predetermined number of image combination frames include an image editing condition for trimming a part of a body of a subject.

Also, it is preferable that, when a plurality of persons are present in the images as subjects, the image editing conditions for the predetermined number of image combination frames include an image editing condition for trimming a part in which a difference between the specific person and other persons is conspicuous.

Further, it is preferable that the image editing unit determine the image editing conditions for the predetermined number of image combination frames based on aspect ratios of the predetermined number of image combination frames of the template.

Furthermore, it is preferable that the template storing unit store a plurality of templates, and that the image forming apparatus further include a template selecting unit which selects a template for forming the combined image from the plurality of templates which are stored in the template storing unit.

Here, it is preferable that the template selecting unit select in advance the template for forming a desired, combined image from the plurality of templates which are stored in the template storing unit prior to the image selection by the image selecting unit, and that the image selecting unit select, from the plurality of images which are stored in the image storing unit, the predetermined number of images suited for combining in each of the predetermined number of image combination frames of the template selected by the template selecting unit and forming the desired, combined image.

Also, it is preferable that the image selecting unit select in advance the predetermined number of images for forming a desired, combined image from the plurality of images which are stored in the image storing unit prior to the template selection by the template selecting unit, and that the template selecting unit select, from the plurality of templates which are stored in the template storing unit, a template with a predetermined number of image combination frames suited for combining the predetermined number of images selected by the image selecting unit and forming a desired, combined image, or it is preferable that, when the template selecting unit cannot select a template with a predetermined number of image combination frames suited for forming the desired, combined image, the template selecting unit determine a layout suited for combining the predetermined number of images selected by the image selecting unit and forming the desired, combined image or form a template with the predetermined number of image combination frames arranged in the layout.

Also, in order to solve the above-described problems, the image forming apparatus according to another aspect of the present invention is an image forming apparatus for forming a combined image by combining a predetermined number of images, and comprises an image storing unit that stores a plurality of images; an image selecting unit that selects in advance the predetermined number of images for forming a desired, combined image from the plurality of images which are stored in the image storing unit; a layout determining unit that determines a layout of the predetermined number of selected images suited for combining the predetermined number of images selected by the image selecting unit and forming the desired, combined image; an image editing unit that edits each of the selected images according to each of image editing conditions of the layout; and an image combining unit that arranges each of the edited images in the layout and combines the arranged images to form the desired, combined image.

In addition, in order to solve the above-described problems, the image forming method of the present invention is an image forming method of forming a combined image by combining a predetermined number of images, and comprises selecting, from a plurality of images stored in advance, the predetermined number of images to be combined in a predetermined number of image combination frames of a template for the combined image, the template being stored in advance and including the predetermined number of image combination frames for which image editing conditions are defined; editing each of the selected images according to each of the image editing conditions for each of the predetermined number of image combination frames of the template; and arranging each of the edited images in each of the predetermined number of image combination frames of the template and combining the arranged images to form the combined image.

Further, it is preferable that the image forming method of the present invention further comprise the step of selecting, from a plurality of templates stored in advance, a template for forming a desired, combined image, prior to the selection of images, and that the step of selecting the images be performed by selecting, from the plurality of images which are stored in advance, the predetermined number of images suited for combining in each of the predetermined number of image combination frames of the template selected in advance and forming the desired, combined image.

Furthermore, it is preferable that the step of selecting the images be performed by selecting, from the plurality of images stored in advance, the predetermined number of images for forming a desired, combined image prior to the selection of the template, and that the image forming method further include a step of selecting a template with the predetermined number of image combination frames suited for combining the predetermined number of images selected in the image selection and forming the desired, combined image, from a plurality of templates which are stored in advance, or it is preferable that the image forming method further include a step of determining a layout suited for combining the predetermined number of images selected in the image selection and forming the desired, combined image or a step of forming a template with the predetermined number of image combination frames arranged in the layout.

Moreover, in order to solve the above-described problems, the image forming method according to another aspect of the present invention is an image forming method of forming a combined image by combining a predetermined number of images, and comprises selecting in advance the predetermined number of images for forming a desired, combined image out of a plurality of images stored in advance; determining a layout of the predetermined number of selected images suited for combining the predetermined number of selected images and for forming the desired, combined image; editing each of the predetermined number of selected images according to each of image editing conditions of the layout; and arranging each of the edited images in the layout and combining the arranged images to form the combined image.

With the image forming apparatus and the image forming method according to the present invention, part of a subject is slipped and arranged, whereby it is possible to form a characteristic and attractive combined image, which is different from an image in which a subject is merely arranged in the center thereof, by effectively using even an image not including entire face and body of a subject, an image including an unnecessary object in the background, an image with poor composition, and an image poorly photographed.

In forming a combined image, images are arranged according to a template set in advance, and hence it is possible to extremely easily and simply form a combined image.

BRIEF DESCRIPTION OF THE DRAWINGS

In the accompanying drawings:

FIG. 3 is a flowchart showing an example of an image forming method according to the present invention;

FIG. 12 is a flowchart showing the other example of the image forming method according to the present invention.

DETAILED DESCRIPTION OF THE PREFERRED EMBODIMENTS

With reference to preferred embodiments illustrated in the accompanying drawings, an image forming apparatus according to the present invention for realizing an image forming method according to the present invention is described in detail below.

Figure 1:
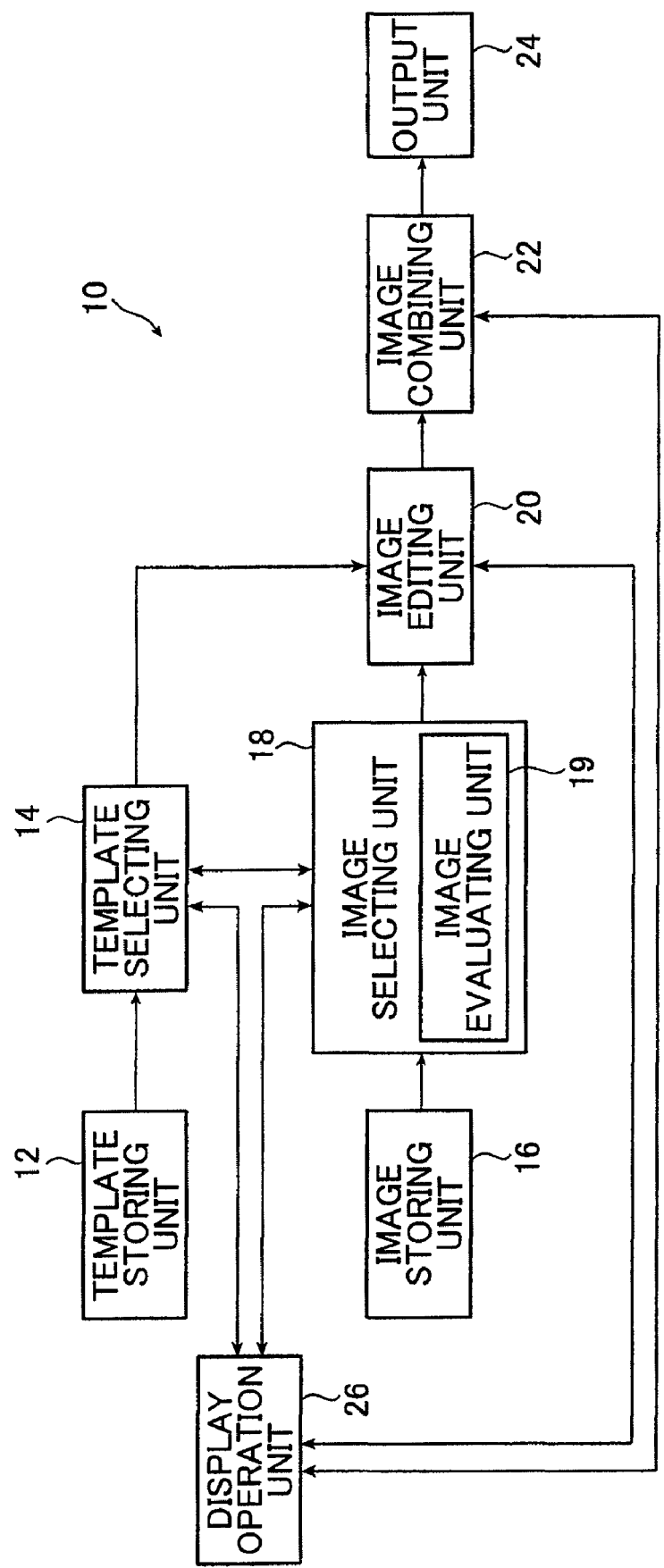
FIG. 1 is a block diagram showing an example of a system configuration of an image forming apparatus according to the present invention.

FIG. 1 is a block diagram of an apparatus configuration of an image forming apparatus according to a first embodiment of the present invention.

An image forming apparatus 10 illustrated in FIG. 1 includes a template storing unit 12, a template selecting unit 14, an image storing unit 16, an image selecting unit 18, an image editing unit 20, an image combining unit 22, and an output unit 24. Further, the image forming apparatus 10 includes a display operation unit 26 including operation devices such as a keyboard and a mouse for inputting user's instructions to the units and a display device such as a monitor.

Figure 2:
FIG. 2 is a schematic diagram showing an example of a combined image according to the present invention.

An example of a combined image to be formed in the present invention is illustrated in FIG. 2.

In the present invention, a characteristic and attractive combined image which is desired by a user is generated by using a plurality of images of the same subject and by trimming and arranging various parts of the images to display the images as one combined image.

For example, as illustrated in FIG. 2, when a specific person is photographed in a plurality of images as a subject, if the subject is photographed in centers of the images, no unnecessary object is photographed in a background, and composition of the image is satisfactory, the images are arranged as they are. On the other hand, concerning an image including only a part of a face of the person, an image with an unattractive background, an image including an unnecessary object in the background, an image including the subject at a position shifted from the center of the image, and the like, the images are arranged with only a part of the person such as eyes or a left half of the face trimmed.

When the images with trimming areas changed according to states of the images are combined and arranged, it is possible to form a characteristic and attractive combined image with the specific person set as a theme using the photographed images without waste. The theme of the combined image according to the present invention is not limited to the specific person. A combined image may be formed with an object other than a person such as a specific event set as a theme.

The theme of the combined image in the present invention is not limited to the specific person, and the image may be formed by setting as a theme a specific event and the like other than the person.

For instance, a landscape, an object, an animal or the like may be set as the theme of the combined image, instead of the specific person or in addition to the specific person. For example, in a template 30 described below and shown in the FIG. 4, combination frames 32a, 32d and 32e may be combination frames for combining images of a whole body of a specific person by setting a person as a theme, while combination frames 32b and 32c are combination frames for combining green trees, lawns, skies or the like by setting landscape as a theme. In addition, an object or an animal such as a personal computer, a cup, a dog or a cat may be set as a theme.

The template storing unit 12 stores templates with a predetermined number of combination frames for forming a combined image which is desired by a user in the present invention. In addition, editing conditions of the predetermined number of combination frames are also stored in the template storing unit 12 in connection with stored templates. The template which is stored in the template storing unit 12 may be one. Alternatively, a plurality of templates may be prepared. When the plurality of templates are prepared, a user may select a desired template using the display operation unit 26 or a template may be automatically selected in the below-mentioned template selecting unit 14.

In the image forming apparatus according to the present invention, even a user unaccustomed to editing work such as layout can easily and simply form a combined image by forming a combined image using the templates stored in the template storing unit 12.

The template selecting unit 14 selects, out of the templates stored in the template storing unit 12, a template used for forming a combined image which is desired by a user and reads out the template.

The selection of the template by the template selecting unit 14 may be before or after the selection of images by the below-described image selecting unit 18. The selection of the template may be automatically performed by the template selecting unit 14 of the image forming apparatus 10. Alternatively, thumbnail images of the templates stored in the template storing unit 12 may be displayed on the monitor of the display operation unit 26 to cause the user to select a desired template. For example, when the template is automatically selected, the template selecting unit 14 may automatically select a template which is set by default, before the selection of the image, or may automatically select an appropriate template according to a predetermined number of images selected by the image selecting unit 18 from a plurality of images stored in the image storing unit 16, after the selection of the image.

The template selecting unit 14 may be configured to determine a layout suited for forming a desired, combined image by using the predetermined number of images selected by the image selecting unit 18, or may be configured to form a new template with a predetermined number of combination frames arranged in the layout, if the appropriate template according to the predetermined number of images selected by the image selecting unit 18 is not stored in the template storing unit 12, for example, a template which a user likes cannot be found in templates displayed in the monitor, and also if an appropriate template according to the selected images cannot be automatically selected. In this case, the new template formed in the template selecting unit 14 may be stored in the template storing unit 12.

The image storing unit 16 stores an image group used for forming a combined image. Images stored in the image storing unit 16 and a method of acquiring the images are not specifically limited. Images photographed by the user with a photographing device such as a digital camera, images downloaded from a server on a network, or the like only have to be acquired via the network. Alternatively, a photographing device such as a digital camera that stores images only has to be directly connected to the image forming apparatus 10 to perform data transmission and reception to thereby acquire the images and store the images in the image storing unit 16.

The image selecting unit 18 selects images used for forming a combined image out of the images stored in the image storing unit 16. It is preferable to select images by extracting images in which a specific person is a subject. Consequently, it is possible to form a combined image with the specific person set as a theme. The extraction of images in which the specific person is the subject only has to be performed by using publicly-known face detection and face recognition processing.

The selection of images is automatically performed on the basis of editing conditions for combination frames of a template used for forming a combined image.

The image selecting unit 18 may have an image evaluating unit 19 that evaluates images stored in the image storing unit 16. In this case, the image selecting unit 18 is preferred to determine an image which is arranged in each of combination frames of the template based on a result of the evaluation by the image evaluating unit 19. Although, in the illustrated example, the image evaluating unit 19 is provided in the image selecting unit 18, it may independently be provided outside the image selecting unit 18.

In addition, in the image selecting unit 18, the predetermined number of images for combining a desired, combined image may be automatically selected.

The image editing unit 20 applies, according to the editing conditions for the combination frames of the template, editing such as trimming (for instance, clipping the images) and expansion and reduction to the images selected by the image selecting unit 18.

The editing may be automatically performed or an operator may operate the display operation unit 26 to perform the editing. The editing for images is described in detail later.

The image combining unit 22 arranges the images edited by the image editing unit 20 in the combination frames of the template to form a combined image. The formed image is sent to the output unit 24 as a combined image.

The output unit 24 outputs, in a predetermined form such as a print or a monitor display of an electronic album, the combined image combined by the image combining unit 22. In the present invention, in the output unit 24, the combined image may be output as a print by generating an image for outputting a print, may be generated as a part of a product produced as electronic data such as an electronic album by generating image data for the electronic album, or may be displayed on a display screen of a display or a monitor by generating image data for displaying.

Specific actions of the image forming apparatus and an image forming method according to the first embodiment of the present invention are described below in detail.

First, as shown in FIG. 3, in Step S50, a template used for forming a combined image is read out from the template storing unit 12. When only one kind of template is stored in the template storing unit 12, the template only has to be automatically read out. When a plurality of templates are stored in the template storing unit 12, the template selecting unit 14 may automatically select a template to be used, for instance, a template set by default. Alternatively, thumbnail images of the templates may be displayed on the monitor of the display operation unit 26 to cause the user to select a desired template using the display operation unit 26.

In the present invention, the template used for forming a combined image includes a plurality of combination frames. In each of the combination frames, editing conditions for images to be arranged in the combination frame are set. The editing conditions are information concerning image processing conditions such as trimming for images to be arranged in the combination frames of the template. As the editing conditions, for example, a part or all of components of a human face such as "face", "eyes", "right eye", "eyes and a nose", and "right half of the face", and a part or all of components of a human body such as "hands", "feet", and "whole body" are designated.

Figure 4:
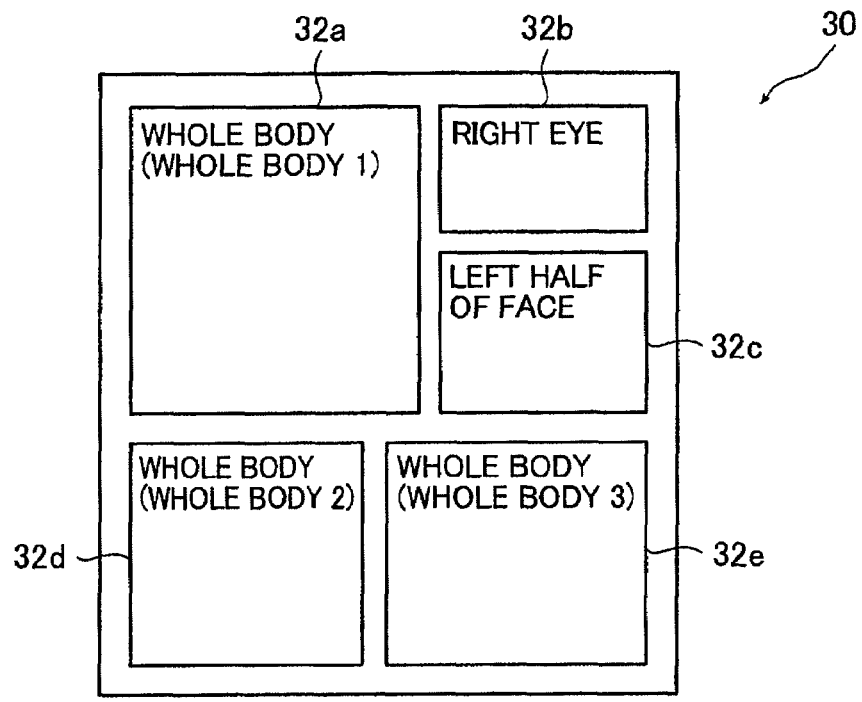
FIG. 4 is a schematic diagram showing an example of a template for the combined image according to the present invention.

An example of the template for a combined image is illustrated in FIG. 4.

A template 30 illustrated in FIG. 4 includes combination frames 32*a* to 32*e* for arranging images, whereby five images can be arranged in the template 30. In the template 30 illustrated in FIG. 4, "whole body" is set in the combination frames 32*a*, 32*d*, and 32*e*, "right eye" is set in the combination frame 32*b*, and "left half of the face" is set in the combination frame 32*c*, as designated information.

When a template to be used (for example, 30 in FIG. 4) is determined and selected by the template selecting unit 14, the selected template 30 and editing conditions for the template are read out from the template storing unit 12 and transmitted to the image selecting unit 18 (Step S50 in FIG. 3).

When the template 30 is selected in advance, the image selecting unit 18 automatically selects, on the basis of the selected template 30, images to be arranged (inserted) in the respective combination frames 32*a* to 32*e* of the template 30 from the image storing unit 16 (Step S52 in FIG. 3).

The selection of images in Step S52 is automatically performed by the image selecting unit 18.

First, the image selecting unit 18 extracts, from the image group stored in the image storing unit 16, a plurality of images including a specific person as a main character of a combined image as a subject. The images stored in the image storing unit 16 may be displayed on the monitor of the display operation unit 26 to cause the user to determine the specific person using the display operation unit 26. Alternatively, the specific person may be set in advance on the apparatus side. When the specific person is determined, the image selecting unit 18 extracts images including the determined specific person out of the image group stored in the image storing unit 16.

A method of extracting images including the specific person is not specifically limited. The extraction of images only has to be performed on the basis of a publicly-known method. For example, it is possible to determine whether or not faces are those of the same person by performing face extraction for images and comparing the extracted face images and a face image of the specific person. In this case, images determined as including the specific person are extracted as candidates of images to be used for forming a combined image.

Next, when the image selecting unit 18 includes the image evaluating unit 19, the image evaluating unit 19 of the image selecting unit 18 performs image analysis for the extracted images and calculates evaluation points for determining in which of the combination frames the images should be arranged.

The evaluation points are calculated from view points of a balance between a person and the background, whether a main person is near the center of an image, whether the whole body of the main person is within the image, whether an unnecessary person or object is not in the background, whether the main person faces the front, and the like. The evaluation points are calculated to be higher for images better satisfying the above-mentioned conditions.

When the evaluation points are calculated, it is determined, according to the number of points, which images are arranged in which of the combination frames on the template. Images with high evaluation points are arranged in the combination frames with the editing condition "whole body", and images with low evaluation points are arranged in the combination frames in which parts of the body of the subject are designated. Among the images with low evaluation points, images satisfying the respective editing conditions are arranged in such a way that an image including enlarged eyes is arranged in the combination frame with the editing condition "eyes" and an image including an enlarged entire face is arranged in the combination frame with the editing condition "right half of the face".

For example, in the example of the template 30 illustrated in FIG. 4, images with high evaluation points are arranged in the combination frame 32*a*, 32*d*, or 32*e* and images with low evaluation points are arranged in the combination frame in which a part of the body of the subject is designated such as the combination frame 32*b* or 32*c*.

In this way, it is possible to determine, according to the setting information for the template and the evaluation points of the images, the images to be arranged in the template and the combination frames in which the images are to be arranged.

The image evaluating unit 19 is preferable to evaluate whether or not a plurality of different parts in the same image can be clipped.

Originally, it is not preferable to use the same image on one template a plurality of times. However, when the image evaluating unit 19 evaluates whether or not there are a plurality of different, clippable parts in the same image and evaluates that some different parts in the same image can be clipped, it is preferable to enable the use of the same image in the different combination frames. For example, because, in the template 30 shown in FIG. 4, it is not preferable to use the same image regarding to "whole body 1" and "whole body 2" and to use the same image regarding to "whole body 1" and "right eye", the image evaluating unit 19 evaluates that the there is no available same image. However, in the case of "right eye" and "left half of face", even if the parts are in the same image, the clipped areas of the image is different, and the image evaluating unit 19 evaluates that there is an available, same image so that "right eye" and "left half of face" in the same image can be used in different combination frames of the same template 30.

Thereby, even when the number of images is small, the deficient number of images can be covered by clipping different parts in the same image.

Further, the image selecting unit 18 may display on a monitor only images, which are candidates for forming the combined image, out of the plurality of images stored in the image storing unit 16 according to editing conditions for each of combination frames of the template to enable the selection.

Figure 5:
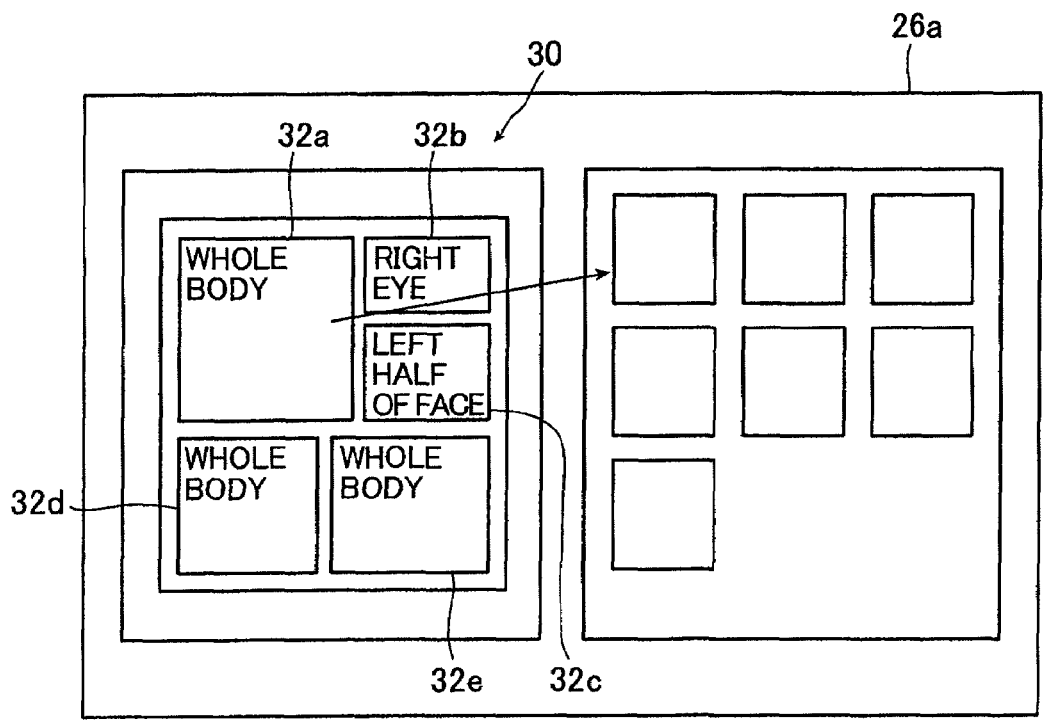
FIG. 5 is a flowchart showing another example of the image forming method according to the present invention.

For example, as shown in FIG. 5, the template 30 shown in FIG. 4 is displayed in the left half of a display screen 26*a* in a monitor of the display operation unit 26. Thus, on the displayed template 30, candidate images to be combined are displayed in the left half of the display screen 26*a* by clicking a combination frame 32*a* by a mouse or the like of the display operation unit 26. For example, since the combination frame 32*a* is a combination frame for an image of a whole body, only images in which a whole body is photographed are displayed out of all the images stored in the image storing unit 16. By clicking one candidate image to be combined out of the displayed candidate images to be combined, the image of the whole body to be combined in the combination frame 32*a* can be selected. Such display and selection of candidate images to be combined can be performed in all of combination frames of the template.

Next, the image editing unit 20 edits, on the basis of the editing conditions for the combination frames of the template, the images to be arranged in the combination frames. The image editing unit 20 performs, on the basis of the editing conditions for the combination frames, image processing (image editing) such as trimming and expansion and reduction processing for the image according to sizes and shapes of the combination frames (Step S54 in FIG. 3).

For example, in FIG. 4, the editing condition for the combination frame 32*b* of the template 30 is "right eye", and thus the image editing unit 20 trims, according to a shape and an aspect ratio of the combination frame 32*b*, a right eye portion of the subject of the image to be arranged in the combination frame 32*b*, and performs expansion and reduction processing so as to match the image with the size of the combination frame 32*b*.

On the other hand, in the combination frames 32*a*, 32*d*, and 32*e*, the image editing unit 20 only has to perform minimum trimming according to shapes and aspect ratios of the respective combination frames and perform expansion and reduction processing according to the sizes of the combination frames so that the entire images fit in the combination frames as much as possible.

Concerning the trimming of the images performed by the image editing unit 20, the user may manually perform the trimming by operating the display operation unit 26 while looking at the monitor of the display operation unit 26. In this case, the image forming apparatus 10 preferably informs the user of the editing conditions for the combination frames of the template by guidance displayed on screen such as "please clip the entire body for this image" or by sound. The user performs trimming of the images on the basis of the editing conditions for the template.

The user can also designate components that the user does not desire to use in the images.

For example, when the user does not desire to use the eye part, the user designates in advance the part as a part not to be used. The image selecting unit 18 performs the selecting and the editing of the images so as not to use the designated components.

The images edited as described above are combined in the template by the image combining unit 22 (Step S56 in FIG. 3) and formed as one combined image. The output unit 24 outputs the combined image in a predetermined format (Step S58 in FIG. 3).

According to the first embodiment of the present invention, it is possible to form an attractive combined image effectively using images that are not usually served for printing such as images with low evaluation points, i.e., an image with poor composition, an image including a person at a corner thereof, and an image including an unnecessary object in the background. Further, it is possible to automatically form a combined image including components of a face and a body of a person simply by following the editing conditions for the template without taking into account parts that the user trims. Consequently, the user can easily form a well-balanced and attractive combined image.

Besides, the components of parts of not only the face but also the body are used, and hence it is possible to form a more characteristic combined image.

Further, when a combined image is formed, even if there are only a small number of images with high evaluation points in selected images, parts of images with low evaluation points can be clipped to be used. Therefore, it is possible to prevent insufficiency of the number of images.

In the first embodiment described above, components of parts of a face and a body of a person in images are trimmed to be used according to the editing conditions for the template. However, depending on components to be trimmed, the user may be unable to distinguish who the person is even if the user looks at images of the components.

Therefore, in a second embodiment of the present invention, components characteristic to a specific person as a main character in a combined image compared with other persons are clipped to be used for a combined image.

Next, specific actions and an image forming method according to the second embodiment of the present invention are described below.

Also in the second embodiment of the present invention, constitutions same as those of the image forming apparatus 10 according to the first embodiment of the present invention are used. Therefore, detailed description of the constitutions same as those of the first embodiment is omitted.

In the second embodiment of the present invention, when the image selecting unit 18 selects images used for a combined image, if images have low evaluation points and a plurality of persons are included in the images, the image selecting unit 18 compares a specific person as a main character and the other persons, extracts components characteristic only to the specific person, and uses the part of the components in a combined image.

Figure 6:
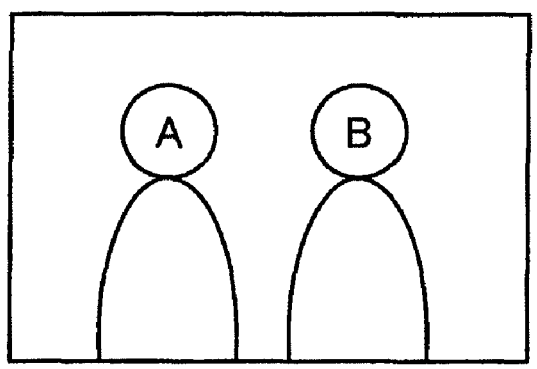
FIG. 6 is a diagram showing an example of an image including a plurality of subjects.

For example, as illustrated in FIG. 6, an image including a subject A and a subject B is used for forming a combined image in which the subject A is a main character. In this case, the image selecting unit 18 compares components of parts of faces such as eyes, noses, and mouths of the subjects A and B and extracts a component most different between the subjects A and B as a component characteristic to the subject A.

Figure 7:
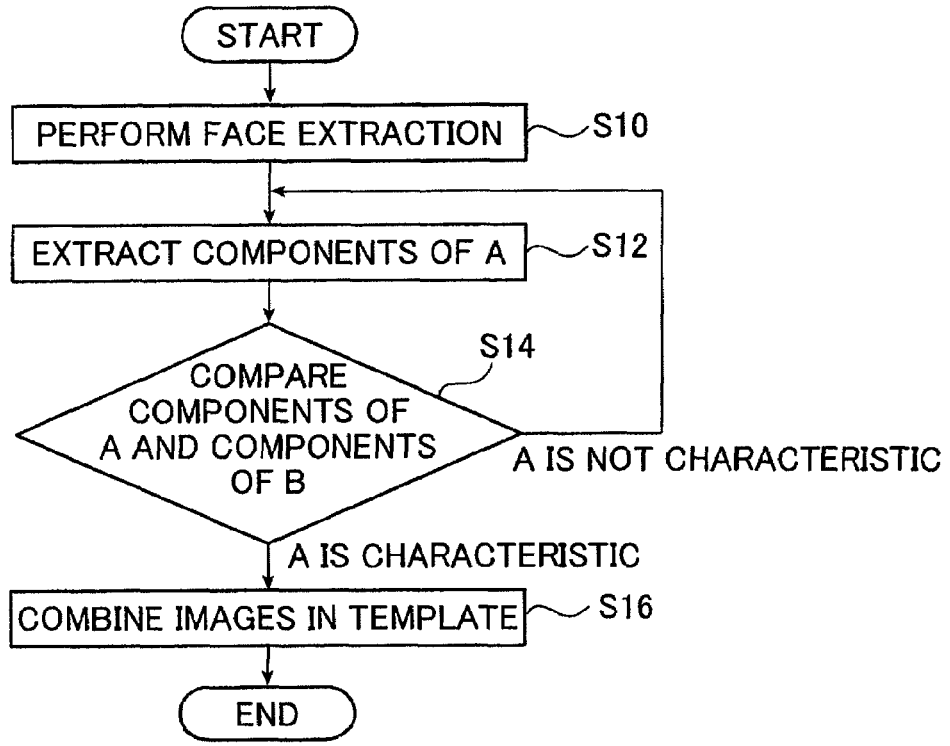
FIG. 7 is a flowchart showing an example of a flow of processing in the image forming apparatus according to the present invention.

A flow of processing of extracting a characteristic component is illustrated in FIG. 7.

First, in Step S10, the image selecting unit 18 performs face extraction in the image illustrated in FIG. 6 and extracts the faces of the subjects A and B. Subsequently, in Step S12, the image selecting unit 18 extracts a face component of the subject A. As an example, the image selecting unit 18 extracts the part of "eyes". Further, the image selecting unit 18 extracts the part of "eyes" of the subject B and compares the parts of the eyes of the subjects A and B (Step S14). When there is a difference equal to or larger than a predetermined threshold between the subjects, the image selecting unit 18 determines that the subject A is characteristic in "eyes", trims and expands or reduces the part of the eyes of the subject A in the image illustrated in FIG. 6, and arranges the part of the eyes in a combination frame of the template to combine images in the template (Step S16).

In Step S14, when there is no difference equal to or larger than the predetermined threshold between the parts of the eyes of the subjects A and B, the image selecting unit 18 determines that the characteristic of the subject A does not appear in this part and that the subject A cannot be distinguished according to only the part of the eyes. In Step S12, the image selecting unit 18 extracts other face components (e.g., the nose, the mouth, or the right half of the face) of the subject A. In Step S14, the image selecting unit 18 extracts the same part as the subject A from the subject B and compares the parts of the subjects A and B. The image selecting unit 18 repeats this processing until a component having a difference equal to or larger than the predetermined threshold between the subjects A and B can be found.

When there is no difference equal to or larger than the predetermined threshold in a component in one part such as the eyes or the nose, components in two or more parts such as the eyes and the nose or the nose and the mouth may be compared in combination.

According to the second embodiment of the present invention described above, a component characteristic to a specific person as a main character in a combined image is used, and hence even if only a part of a person is used, it is possible to distinguish the person and form a more attractive combined image.

Further, as a third embodiment of the present invention, a component may be automatically determined according to a shape of a combination frame.

In the first and second embodiments of the present invention, the editing conditions are set in advance for the combination frames of the template. However, in the third embodiment of the present invention, even when editing conditions for combination frames are not set in a template, it is possible to easily form an attractive combined image.

Also in the third embodiment of the present invention, constitutions same as those of the image forming apparatus 10 according to the first and second embodiments of the present invention are used. Therefore, detailed description of the constitutions same as those of the first and second embodiments of the present invention is omitted.

Figure 8:
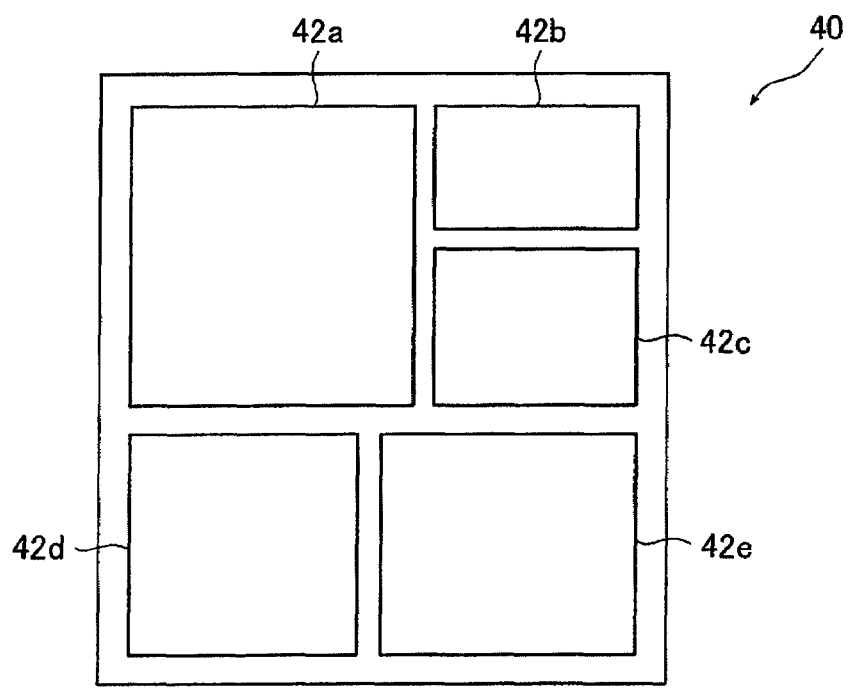
FIG. 8 is a schematic diagram showing another example of the template for the combined image according to the present invention.

An example of a template of a combined image according to the third embodiment of the present invention is illustrated in FIG. 8.

A template 40 illustrated in FIG. 8 includes combination frames 42a to 42e for arranging images, whereby five images can be arranged in the template 40. In the template 40 illustrated in FIG. 8, unlike the other embodiments described above, editing conditions are not set.

In the third embodiment of the present invention, when the template selecting unit 14 selects a template, the image selecting unit 18 selects images from the image storing unit 16. Further, the image selecting unit 18 determines, according to shapes of combination frames of the template, combination frames in which the selected images are arranged and editing conditions.

The editing conditions are determined on the basis of the shapes of the combination frames, specifically, aspect ratios. For example, in FIG. 8, the combination frame 42b has a shape of a rectangle long in a horizontal direction, and hence an editing condition for the combination frame 42b is "eyes". The combination frame 42c has a shape slightly longer vertically than the combination frame 42b, and hence an editing condition for the combination frame 42c is "eyes and a nose".

When the image selecting unit 18 sets the editing conditions, as in the first embodiment of the present invention, the images are trimmed and arranged according to the editing conditions to thereby form a combined image.

According to the third embodiment of the present invention, editing conditions are set according to aspect ratios of the combination frames of the template and images are trimmed according to the editing conditions. Therefore, it is possible to freely trim and arrange images matching the shapes of the combination frames without taking into account a face area of a person, composition of the background, and the like.

Further, as a fourth embodiment of the present invention, after a user manually designates a trimming range, it is possible to determine, on the basis of the designated range, combination frames or a template in which images are arranged.

Also in the fourth embodiment of the present invention, constitutions same as those of the image forming apparatus 10 according to the first to third embodiments of the present invention are used. Therefore, detailed description of the constitutions same as those of the first to third embodiments of the present invention is omitted.

In the fourth embodiment of the present invention, when the template selecting unit 14 selects a template, the image selecting unit 18 selects images from the image storing unit 16.

The selected images are displayed on the monitor of the display operation unit 26. Concerning an arbitrary image among the displayed images, the user trims desired components such as eyes and a nose using the display operation unit 26.

When the trimming by the user is completed, the image selecting unit 18 determines a shape of the trimmed image and which part of a subject is trimmed. On the basis of a result of the determination, combination frames in which the selected images are arranged are determined according to editing conditions for the combination frames of the template.

For example, in an image in which only the part of the eyes of a person is trimmed, the image only has to be arranged in a combination frame in which "eyes" is set as an editing condition. The image may be arranged in a combination frame having an aspect ratio most similar to that of the trimming range of the image.

It only has to be determined, according to a publicly-known technology of image analysis, which component in which part of the person is trimmed by the user.

According to the fourth embodiment of the present invention, it is possible to easily form a combined image more suitable for preference of the user.

In the above-mentioned first to fourth embodiments, a template is firstly selected, and then, images suited for the selected template are selected. However, the present invention is not limited to these. As in the fifth or the sixth embodiments of the present invention, images for forming a combined image may be selected in advance, and a template suited for the selected images may be then selected or formed.

First, specific actions and an image forming method according to the fifth embodiment of the present invention are described below.

Figure 9:
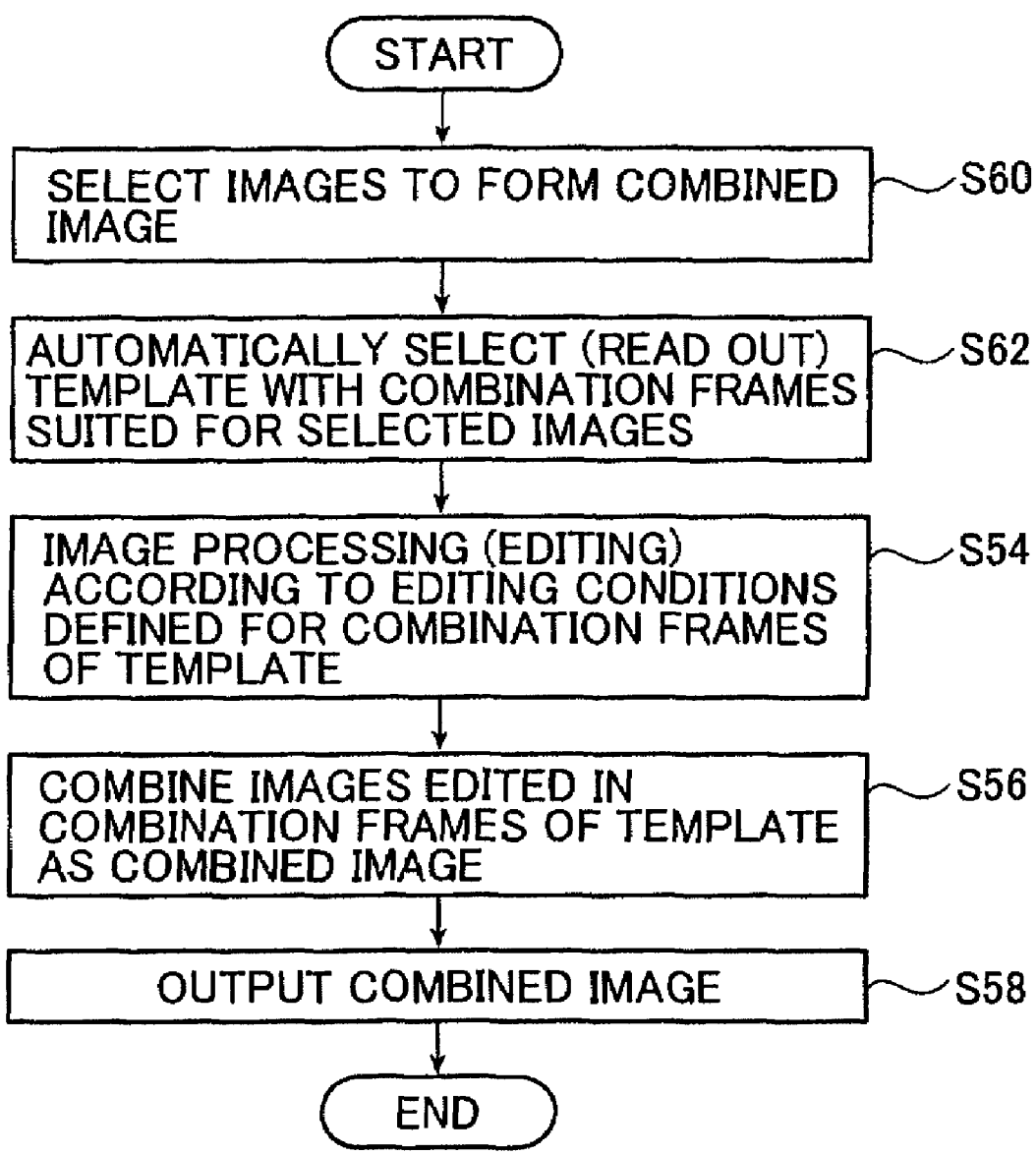
FIG. 9 is a flowchart showing the other example of the image forming method according to the present invention.

FIG. 9 is a flowchart showing an example of the image forming method according to the fifth embodiment of the present invention. The flowchart of the image forming method according to the fifth embodiment shown in FIG. 9 shows the same steps as those of the image forming method according to the first embodiment shown in FIG. 3 except that an order of the template selecting step and the image selecting step is replaced. Accordingly, the same reference numerals are given for the same steps other than the above-replaced steps, and explanation for the same steps is omitted.

First, as shown in FIG. 9, in Step S60, the image selecting unit 18 automatically selects a predetermined number of images to be combined as a desired, combined image before selecting a template. The automatic selection of images may be performed according to predetermined conditions, for example, editing conditions such as a specific person which is a main theme of the combined image, the number of the images, a kind of image to be combined (a whole body, a component of the body, for example, an upper body, a right side of the body, a left side of the body, a face facing to right, a face facing to left, a component of a face (eyes (a right eye, a left eye or both eyes), a nose, ears (a right ear, a left ear or both), eyebrows, a hair) or a component of the body (arms, legs or the like)), and may be performed by automatically selecting the images according to the number of combination frames, editing conditions or the like, and further, may be performed by automatically selecting the images in view of sizes of the combination frames. In addition, when images are selected before the selection of a template, the images stored in the image storing unit 16 may be displayed as, for example, thumbnail images on the monitor so that a user can select images by the display operation unit 26 out of the displayed images.

Next, in Step S62, the template selecting unit 14 can select, out of a plurality of templates stored in the template storing unit 12, a template with combination frames suited for combining the predetermined number of images selected by the image selecting unit 18 in Step S60 and forming a desired, combined image. In this case, candidate templates with combination frames which enable the combination of the selected images may be displayed on the monitor of the display operation unit 26 so that the template selecting unit 14 can select a template to be used by clicking one of the displayed candidate templates by an operation unit in the display operation unit 26.

After the images are firstly selected and the template is secondly selected accordingly, as in the flowchart shown in FIG. 3, the images are edited by the image editing unit 20 in an image editing step S54, one combined image is formed by combining images in the template by the image combining unit 22 in an image combining step S56, and the combined image is output by an output unit 24 in an output step S58.

In the meantime, since a template is firstly selected in the above-mentioned first to fourth embodiments, an appropriate combined image cannot be formed when no image suited for the template is present at the stage of selecting images. For example, when the template 30 shown in FIG. 4 is selected, and if there are only two images in which a whole body is photographed, the same image are forced to be used twice.

Figures 10, 13:
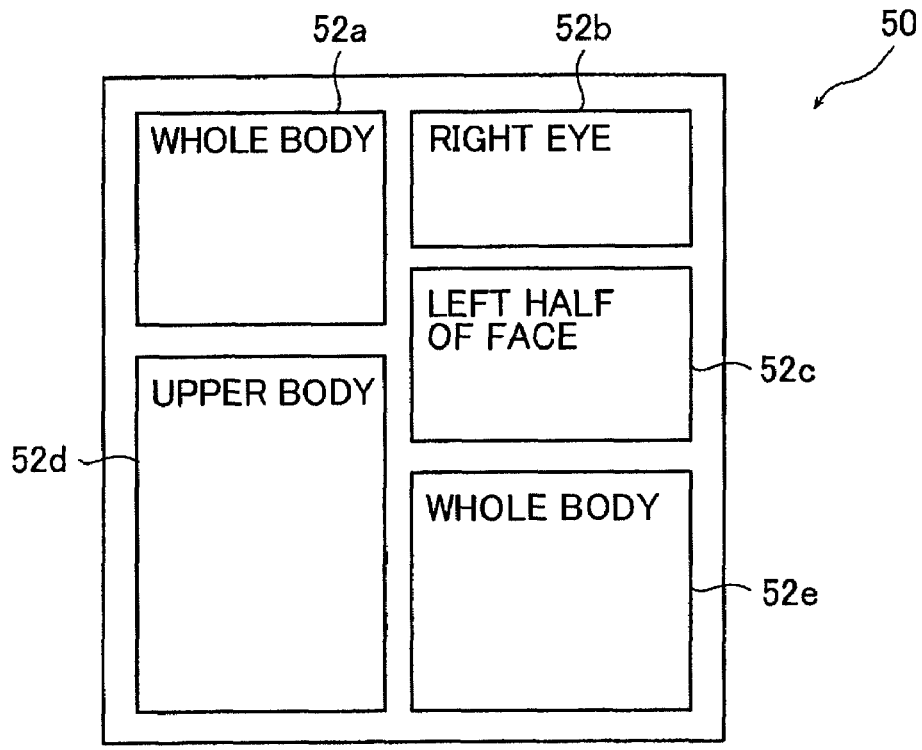
FIG. 10 is a schematic diagram showing another example of the template for the combined image according to the present invention.
FIG. 13 is an illustration showing an example of image data of the image and its information that are selected in the image forming apparatus shown in FIG. 11.

However, in the present embodiment, the images are firstly selected, and then, the template can be automatically selected, or candidate templates can be displayed so that one of them can be selected. Accordingly, even when there are only two images in which a whole body is photographed, the template with one or two combination frames in which a whole body is to be displayed can be used, as the template 50 shown in FIG. 10. In addition, the same can be said for conditions such as a right eye and a left half of a face. Here, the template 50 shown in FIG. 10 includes two combination frames 52a and 52e for combining images of a whole body, a combination frame 52b for combining images of a right eye, a combination frame 52c for combining images of a left half of a face, and a combination frame 52d for combining images of an upper body, which can also be said as a template in which the combination frame 32d for the whole body in the template 50 shown in FIG. 4 is changed to the combination frame 52d for the upper body.

Next, an image forming apparatus according to the sixth embodiment of the present invention is described below.

Figure 11:
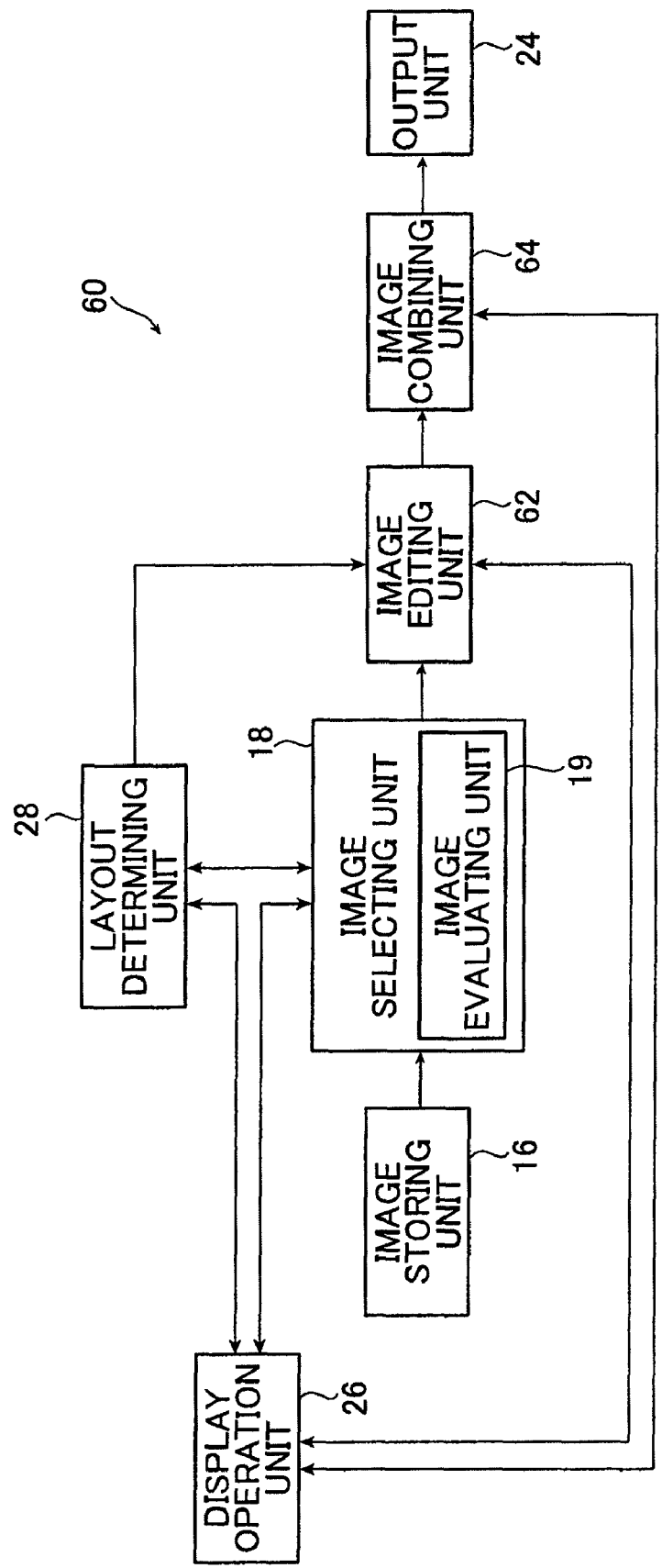
FIG. 11 is a block diagram showing another example of the system configuration of the image forming apparatus according to the present invention.

FIG. 11 is a block diagram of an example of the system configuration of the image forming apparatus according to the sixth embodiment of the present invention.

An image forming apparatus 60 shown in FIG. 11 is substantially the same as the image forming apparatus 10 shown in FIG. 1 except that a layout determining unit 28 is included instead of the template storing unit 12 and the template selecting unit 14. The same reference numerals are given for the same elements, and explanation for those elements is omitted.

The image forming apparatus 60 according to the present embodiment includes the layout determining unit 28, an image storing unit 16, an image selecting unit 18, an image editing unit 62, an image combining unit 64, an output unit 24 and a display operation unit 26.

The layout determining unit 28 automatically determines a layout suited for arranging a predetermined number of images selected in advance out of a plurality of images stored in the image storing unit 16 by the image selecting unit 18, that is, a layout suited for forming a desired, combined image by using the predetermined number of images selected by the image selecting unit 18.

The image editing unit 62 applies, according to the editing conditions for the automatically-selected layout, editing such as trimming (for instance, clipping the images) and expansion and reduction to the images selected by the image selecting unit 18.

The editing performed by the image editing unit 62 can be the same as that performed by the image editing unit 20 shown in FIG. 1 except that the editing by the unit 62 is performed according to the editing conditions of the layout.

In addition, the image combining unit 64 arranges in the automatically-selected layout the images edited by the image editing unit 62 to form a combined image, as the image combining unit 22 shown in FIG. 1. The thus formed image is sent to the output unit 24 as the combined image.

In the present embodiment, since a layout is dynamically determined according to the selected images, there is no need to prepare in advance a fixed template, whereby the template storing unit 12 is not necessary to be provided.

Next, specific actions and an image forming method according to the sixth embodiment of the present invention are described below.

Here, FIG. 12 is a flowchart showing an example of the image forming method according to the sixth embodiment of the present invention.

The flowchart of the image forming method according to the sixth embodiment shown in FIG. 12 shows the same steps as those of the image forming method according to the fifth embodiment shown in FIG. 9 except that a layout of the selected images is determined instead of the selection of the template. Accordingly, the different points are mainly described below, and detailed description with respect to the similar points is omitted.

First, in step S70 shown in FIG. 12, the image selecting unit 18 selects a predetermined number of images for forming a desired, combined image out of a plurality of images stored in the image storing unit 16, as in Step S60 shown in FIG. 9. For example, images with various sorts of features shown in FIG. 13 can be selected.

Next, in Step S72, a layout suited for arranging and combining, as a combined image, the predetermined number of images selected by the image selecting unit 18 is automatically selected by the layout determining unit 28. That is, in Step S72, the layout determining unit 28 automatically determines a template layout (a template in which a predetermined number and size of combination frames are laid out) according to the features of the selected images shown in FIG. 13.

Subsequently, in Step S74, the image editing unit 62 edits (image processing) the predetermined number of images selected by the image selecting unit 18 according to editing conditions of the automatically-selected layout. In addition, the editing performed by the image editing unit 62 can be the same as that performed by the image editing unit 20 shown in FIG. 1 except that the unit 62 edits according to editing conditions of the layout.

Next, in Step S76, a combined image is formed by the image combining unit 64 by arranging the images edited by the image editing unit 62 in the automatically-selected layout and combining the images, as the image combining unit 22 shown in FIG. 1.

Next, in Step S58, the thus formed image is sent to the output unit 24 as a combined image.

In the present embodiment, since a layout is dynamically determined according to the selected images, there is no need to prepare in advance a fixed template.

In addition, as the seventh embodiment of the present invention, when the template suited for the selected images cannot be selected in the template selecting step shown in FIG. 9 in the fifth embodiment of the present invention in which the image forming apparatus 10 shown in FIG. 1 is used, that is, when the template selecting unit 14 cannot select, out of the plurality of templates stored in the template storing unit 12, the template with combination frames suited for combining the predetermined number of images selected by the image selecting unit 18 and forming the desired, combined image, a function of the layout determining unit 28 shown in FIG. 11 which automatically determines a layout suited for combining the predetermined number of images selected by the image selecting unit 18 and forming the desired, combined image may be included, or a new template with a predetermined number of combination frames which are arranged in this layout may be automatically formed.

Also in the seventh embodiment, the combined image can be output according to the flowchart shown in FIG. 12.

Additionally, the new automatically-formed template and the template in which arrangement of the selected images arranged and combined according to the automatically-determined layout is used to form combination frames can be stored in the template storing unit 12 as new templates.

According to the present invention described above, components in parts of a face and a body of a subject are trimmed and arranged in the combination frames of the template to thereby form a combined image. Consequently, although it is undesirable for the user to clip a part of the face and the like normally, because the components themselves are trimmed, it is possible to perform unprecedentedly attractive printing without feeling a sense of strangeness.

The above-mentioned first to seventh embodiments of the present invention may be used independently from one another or two or more of the embodiments may be combined to form a more effective combined image.

The image forming method and the image forming apparatus according to the present invention have been described in detail. However, it goes without saying that the present invention is not limited to the various embodiments described above and may be variously improved and modified without departing from the spirit of the present invention.

What is claimed is:

1. An image forming apparatus for forming a combined image by combining a predetermined number of first images, comprising:

an image storing unit that stores a plurality of images;

a template storing unit that stores a template for the combined image, said template including a predetermined number of image combination frames, and designated information designating a specific part of a subject being each of said predetermined number of first images to be arranged and combined in each of said predetermined number of image combination frames according to a position and a size of each of said predetermined number of image combination frames being set in each of said predetermined number of image combination frames of said template as each of image editing conditions;

an image selecting unit that automatically extracts a plurality of candidate images satisfying predetermined conditions for forming said combined image from said plurality of images stored in said image storing unit, and thereafter automatically selects a predetermined number of second images to be combined respectively in the predetermined number of image combination frames of said template read out from said template storing unit out of said plurality of candidate images extracted, each of said predetermined number of second images satisfying said designated information set in each of said predetermined number of image combination frames of said template and said predetermined number of second images being same in number as said predetermined number of first images;

an image editing unit that edits each of said predetermined number of second images selected by said image selecting unit according to each of said image editing conditions set for each of said predetermined number of image combination frames of said template to form said predetermined number of first images to be combined respectively in the predetermined number of image combination frames of said template; and an image combining unit that arranges each of said predetermined number of first images formed by said image editing unit in each of said predetermined number of image combination frames of said template and combines said predetermined number of first images to form said combined image.

2. The image forming apparatus according to claim 1, wherein said image editing conditions for said predetermined number of image combination frames include designation of a trimming part of a subject in said plurality of images; and said editing performed by said image editing unit includes expansion and reduction and trimming of said predetermined number of second images corresponding to sizes of said predetermined number of image combination frames of said template, respectively.

3. The image forming apparatus according to claim 1, further comprising an image evaluating unit that evaluates said plurality of images stored in said image storing unit according to a position and a size of a specific part of a specific subject in each of said plurality of images, wherein said image selecting unit determines, based on a result of the evaluation by said image evaluating unit, said predetermined number of second images suited to be arranged in said predetermined number of image combination frames of said template.

4. The image forming apparatus according to claim 3, wherein said image evaluating unit evaluates whether or not a plurality of different parts can be clipped in the same candidate image, and when said image evaluating unit has evaluated that said plurality of different parts can be clipped in said same candidate image, said image selecting unit selects said same candidate image as the second image in which said plurality of different parts can be clipped, and said image editing unit clips the plurality of different parts from the same second image and forms the first images different from each other to be combined in the image combination frames different from each other.

5. The image forming apparatus according to claim 1, wherein, when said predetermined conditions includes a specific person, said image selecting unit selects only images including a specific person as the candidate image.

6. The image forming apparatus according to claim 5, wherein, when a plurality of persons are present in the images as subjects, the image editing conditions for the predetermined number of image combination frames include an image editing condition for trimming a part in which a difference between the specific person and other persons is conspicuous.

7. The image forming apparatus according to claim 1, wherein said image selecting unit displays, according to each of said image editing conditions for each of said predetermined number of image combination frames of said template, only images which are candidates to be combined, to enable the selection.

8. The image forming apparatus according to claim 1, wherein the image editing conditions for the predetermined number of image combination frames include an image editing condition for trimming a part of a face of a subject of the second image.

9. The image forming apparatus according to claim 1, wherein the image editing conditions for the predetermined number of image combination frames include an image editing condition for trimming a part of a body of a subject of the second image.

10. The image forming apparatus according to claim 1, wherein the image editing unit determines the image editing conditions for the predetermined number of image combination frames based on aspect ratios of the predetermined number of image combination frames of the template.

11. The image forming apparatus according to claim 1, wherein said template storing unit stores a plurality of templates, and said image forming apparatus further includes:

a template selecting unit which selects a template for forming said combined image from said plurality of templates which are stored in said template storing unit.

12. The image forming apparatus according to claim 11, wherein said template selecting unit selects in advance said template for forming a desired, combined image from said plurality of templates which are stored in said template storing unit prior to the image selection by said image selecting unit, and said image selecting unit selects, from said plurality of images which are stored in said image storing unit, said predetermined number of second images suited for combining in each of said predetermined number of image combination frames of said template selected by said template selecting unit and forming said desired, combined image.

13. An image forming method of forming a combined image by combining a predetermined number of first images and following steps of said image forming method being performed by an image forming apparatus, said image forming method comprising:

- an image selecting step of automatically extracting a plurality of candidate images satisfying predetermined conditions for forming said combined image from a plurality of images stored in advance, and thereafter automatically selecting, from said plurality of candidate images extracted, a predetermined number of second images to be combined respectively in a predetermined number of image combination frames of a template for said combined image, said template being stored in advance and including said predetermined number of image combination frames, each of said predetermined number of second images satisfying said designated information set in each of said predetermined number of image combination frames of said template and said predetermined number of second images being same in number as said predetermined number of first image;
- an image editing step of editing each of said predetermined number of second images selected by said image selecting step according to each of said image editing conditions set for each of said predetermined number of image combination frames of said template to form said predetermined number of first images to be combined respectively in the predetermined number of image combination frames of said template; and
- a combined image forming step of arranging each of said predetermined number of first images formed by said image editing step in each of said predetermined number of image combination frames of said template and combining said predetermined number of first images to form said combined image.

14. The image forming method according to claim 13, further comprising a template selecting step of selecting, from a plurality of templates stored in advance, a template for forming a desired, combined image, prior to the image selecting step, said template selecting step being performed by said image forming apparatus, wherein said step of selecting the images is performed by extracting said plurality of candidate images from said plurality of images which are stored in advance, and selecting, from said plurality of candidate images extracted, said predetermined number of second images suited for combining respectively in each of said predetermined number of image combination frames of said template selected in advance by said template selecting step and forming said desired, combined image.

* * * * *